F. A. SMITH.
SPLASH SYSTEM OF LUBRICATION.
APPLICATION FILED SEPT. 20, 1916.
1,230,815.
Patented June 19, 1917.
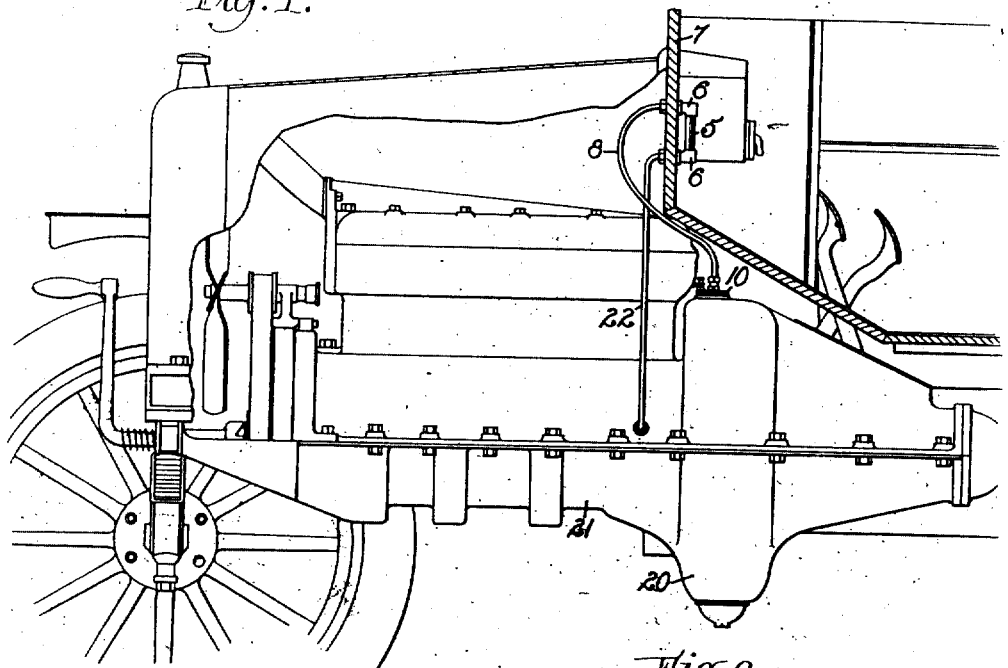
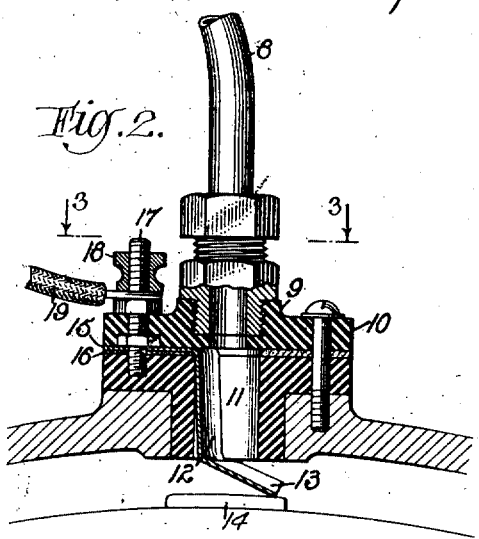
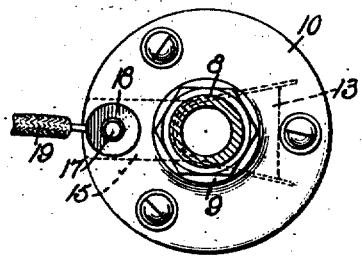
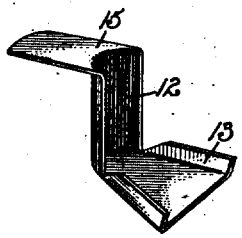
WITNESSES
INVENTOR
F. A. Smith
BY
ATTORNEYS

UNITED STATES PATENT OFFICE.

FRANK A. SMITH, OF EAST ORANGE, NEW JERSEY.

SPLASH SYSTEM OF LUBRICATION.

1,230,815.     Specification of Letters Patent.     Patented June 19, 1917.

Application filed September 20, 1916. Serial No. 121,175.

*To all whom it may concern:*

Be it known that I, FRANK A. SMITH, a citizen of the United States, and a resident of East Orange, in the county of Essex and State of New Jersey, have invented a new and Improved Oil Indicator and Distributer for the Splash System of Lubrication, of which the following is a full, clear, and exact description.

My invention relates to an oil indicator and distributer for the splash system of lubrication. An object thereof is to provide a simple and inexpensive contrivance in which there are no movable parts, and which can be easily and quickly attached to a splash-lubricant system at comparatively little expense and with substantially no alteration in the splash system.

A further object of the invention is to provide an oil indicator and distributer particularly adaptable for the Ford cars.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a fragmentary longitudinal section through a Ford car showing the engine in elevation and equipped with my oil indicator and distributer;

Fig. 2 is an enlarged vertical section through the plug through which the connection between the indicator and the casing takes place;

Fig. 3 is a horizontal section on line 3—3, Fig. 2; and

Fig. 4 is a perspective view of the scoop or baffle which is to direct the lubricant toward the indicator.

The oil indicator and distributer constitute, in reality, a bypass from the splash system of lubrication to any part of the engine casing, and in which bypass a transparent member is interposed which indicates the circulation of the lubricant therethrough caused by the splash. To transform the rotary movement of the lubricant, imparted thereto by the splash-producing means, a scoop or baffle is interposed at the entrance to the bypass; and to utilize the maximum velocity acquired by the lubricant, the scoop is placed at the point where the velocity is highest, that is, substantially opposite that part of the casing where normally the lubricant is contained. It therefore follows that the scoop is at the highest point of the casing where the splash-producing means are located.

The bypass is so arranged as to present a hydrostatic head of such a magnitude that a sufficient body of lubricant must be moved by the splashing means thereto before it will circulate through the transparent member. In consequence, a circulation through the bypass will only take place when there is a sufficient quantity of lubricant present in the casing. Therefore there would be no flow through the indicator when the quantity of lubricant therein falls below a predetermined quantity, thus indicating that lubricant must be poured into the casing.

Referring to the drawings, 5 is a glass tube the ends of which are engaged by tubular members 6 which are secured by any suitable means to the dashboard 7 of the car. The upper tubular member 6 is connected by a conduit 8 to a plug 9, which in the Ford car constitutes the magneto contact plug. This is removed and in place thereof another plug is substituted which has a larger flange 10. The opening 11 through which normally the magneto contact projects is utilized as a passage, which is in communication with the conduit 8. The contact is formed by sheet metal 12 which extends through the opening 11 to form a scoop 13 resting on the contact 14 which leads to the coil. A portion of the sheet member 12 is turned to form a flange 15 to rest between the gasket 16 and the flange 10 of the plug 9. From this flange a contact is obtained by means of a stud 17 secured to the flange 10 and provided with a knurled nut 18 by means of which a wire 19 can be secured to said stud.

The oil normally contained in the bottom 20 of the crank casing 21 is splashed by the flywheel and magnets secured thereto. When there is a sufficient body of oil present in the bottom of the casing the magnets will carry the oil on to the scoop, which will divert the flow and direct it through the passage 11 into the conduit 8 toward the glass tube 5. The oil from the glass tube 5 may be conveyed to any part of the engine casing by a conduit 22. This conduit, therefore, constitutes the distributing conduit.

Experiments performed by me with the device have shown that the circulation will take place when the engine is at normal speed and the oil has been slightly warmed up by the working of the engine. The crank casing must contain a normal supply of oil and the glass tube 5 be located in a position substantially as shown in Fig. 1. The circulation through the tube 5 is automatically interrupted as the supply of lubricant in the crank casing falls below normal, thus indicating that oil should be added to the crank casing. By lowering the tube 5 nearer to the plug 9 the circulation will continue, even after the supply of oil falls below normal; but as soon as the supply of oil in the crank casing becomes very low there will be no circulation through the tube 5, even if the tube is placed at the bottom of the dashboard.

From the above description it will be seen that my oil indicator and distributer does not comprise any movable parts in itself. It utilizes the splash-producing means as means for driving the lubricant through the indicator. The only element which is subjected to impact is the scoop or baffle 13; but as will be seen from the drawings, this is braced by the contact 14 and, therefore, is not subjected to any wear, although free to yield under the impact of the oil thrown against it.

When the oil indicator and distributer is to be supplied to engines other than the Ford, a special connection may be made to a high point of the splash-producing means, if there is no passage for a plug as utilized by the applicant in the Ford engine.

While I have described the principle of operation, together with the device which I now consider to be the best embodiment thereof, I desire to have it understood that the device shown is merely illustrative and that such changes may be made as are within the scope of the appended claims.

I claim:

1. In combination with the splash system of oiling in the Ford car, a transparent member adapted to be secured to the dashboard, a conduit adapted to connect the highest point of said transparent member to the opening for the magneto contact, said conduit presenting a scoop for diverting the circular movement of the oil caused by the splash-producing means into the conduit, said scoop forming the magneto contact point, and a conduit from the lower part of said transparent member.

2. In combination with the splash system of oiling of a Ford car which has the magneto contact opening above and in proximity of the flywheel, a glass tube adapted to be secured to the dashboard of the car, a conduit connected to the highest point of the glass tube and the contact point opening, a scoop at the opening for the magneto contact for diverting the circular flow caused by the splash-producing means into the conduit, said scoop forming the magneto contact point, and a return conduit from the lower point of the glass tube.

3. In combination with the splash system of oiling of an internal-combustion engine including a magneto, a scoop for diverting the circular movement of the oil caused by the splash-producing means, said scoop forming the electric contact point of the magneto, and oil distributing means associated with said scoop.

FRANK A. SMITH.